United States Patent
Fukuda

(10) Patent No.: US 7,464,213 B2
(45) Date of Patent: Dec. 9, 2008

(54) MEMORY ADAPTER AND UNIT INCLUDING INDEPENDENT RADIO CIRCUIT AND REMOVABLE MEMORY STORE

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 21 days.

(21) Appl. No.: 11/302,919

(22) Filed: Dec. 14, 2005

(65) Prior Publication Data
US 2006/0149855 A1    Jul. 6, 2006

(30) Foreign Application Priority Data
Dec. 24, 2004    (JP)    ............... 2004-374294

(51) Int. Cl.
*G06F 13/00*    (2006.01)
(52) U.S. Cl. ..................... 710/301; 711/115
(58) Field of Classification Search ................. 710/301, 710/302; 711/115
See application file for complete search history.

(56) References Cited

U.S. PATENT DOCUMENTS

| | | | |
|---|---|---|---|
| 6,243,686 | B1 | 6/2001 | McPherson et al. |
| 6,353,870 | B1 | 3/2002 | Mills et al. |
| 6,804,749 | B2 * | 10/2004 | Chien et al. ............... 711/115 |
| 2002/0037745 | A1 * | 3/2002 | Yahiro ....................... 455/557 |
| 2002/0174337 | A1 * | 11/2002 | Aihara ........................ 713/172 |
| 2004/0060988 | A1 | 4/2004 | Sakamoto et al. |
| 2004/0192380 | A1 | 9/2004 | Chen |
| 2005/0086413 | A1 * | 4/2005 | Lee et al. ..................... 710/313 |
| 2005/0224589 | A1 * | 10/2005 | Park et al. ................... 235/492 |
| 2006/0029094 | A1 * | 2/2006 | Chen et al. ................... 370/438 |
| 2007/0138305 | A1 * | 6/2007 | Ito ............................. 235/492 |
| 2007/0239929 | A1 * | 10/2007 | Chen et al. ................... 711/103 |
| 2007/0259570 | A1 * | 11/2007 | Moshayedi ................. 439/638 |

FOREIGN PATENT DOCUMENTS

WO    WO 2005/032071    4/2005

* cited by examiner

*Primary Examiner*—Glenn A Auve
(74) *Attorney, Agent, or Firm*—Rockey, Depke & Lyons, LLC; Robert J. Depke

(57) ABSTRACT

Data stored in a memory unit can be transmitted to an external apparatus such as a PC, a television or a printer without relying on operations carried out on a host apparatus, onto which the memory unit has been mounted. The memory unit includes a memory card and an adapter into which the memory card is inserted. At a request made by the external apparatus through a radio transmission line as a request for data, the data can be read out from a memory device employed in the memory card in accordance with control executed by a communication control section employed in the adapter. Thus, it is not necessary to install driver software for controlling communications in a digital camera or the like serving as the host apparatus, on which the memory unit is mounted.

19 Claims, 10 Drawing Sheets

MEMORY ADAPTER AND UNIT INCLUDING INDEPENDENT RADIO CIRCUIT AND REMOVABLE MEMORY STORE

CROSS REFERENCES TO RELATED APPLICATIONS

The present invention contains subject matter related to Japanese Patent Application JP 2004-374294 filed in the Japanese Patent Office on Dec. 24, 2004, the entire contents of which being incorporated herein by reference.

BACKGROUND OF THE INVENTION

The present invention relates to an adapter freely mountable onto and dismountable from an information apparatus to be used in the information apparatus as well as relates to a memory card and a memory unit, which includes the memory card and the adapter for accommodating the memory card in such a way that the memory card can be mounted onto and dismounted from the adapter with a high degree of freedom. More particularly, the present invention relates to an adapter used for accommodating a memory card and provided with a radio communication function for transmitting data stored in the memory card by radio communication to an external apparatus, and relates to a memory unit including the adapter.

To put it in detail, the present invention relates to an adapter and a memory unit including the adapter for accommodating a memory card allowing data stored in the memory unit to be transmitted with ease to an external apparatus without relaying on operations carried out on a host apparatus on which the memory unit has been mounted. More particularly, the present invention relates to an adapter used for accommodating a memory card and provided with a radio communication function for transmitting data stored in the memory card by radio communication without the need to install driver software for controlling communications in a host apparatus on which the memory unit has been mounted, and relates to a memory unit including the adapter.

Accompanying recent technological renovation, a variety of information apparatus for handling computer files has been developed and put in markets. Examples of the information apparatus are a PC (Personal Computer), a PDA (Personal Digital Assistant), a digital camera and a portable media player, which handle the computer files containing various kinds of media such as a text, an image and a sound. Most main information apparatus each have interfaces such as a card slot and a connector, which allow a cartridge memory device to be mounted onto the apparatus and dismounted from the apparatus with a high degree of freedom. Examples of the cartridge memory device are a memory card and a USB memory. The memory card can be one of a plurality of standard products such as a memory stick (a registered trademark) and an SD (Secure Digital) card. Generic technical term 'memory card' used in the following description represents a memory device that can be mounted onto and dismounted from an information apparatus.

For example, after an image taken by using a digital camera is encoded in the camera into data having a predetermined file format such as a JPEG (Joint Picture Experts Group) format or a MPEG (Moving Picture Experts Group) format, the data having the file format is stored in a memory card. In this case, the memory card can be used for storing a number of images that cannot be stored in a memory embedded in an information apparatus as a memory having a relatively small capacity. As the memory card is filled up with data stored therein, the memory card can be replaced with another memory card, which offers a new storage capacity for saving further taken images.

In addition, the file of an image taken by using a digital camera can be transferred to another information apparatus such as a personal computer, which is capable of carrying out image processing such as adjustment of a picture quality and re-encoding on the image, or image processing such as storing the image in a database or putting the image in an album. As an alternative, an image taken by using a digital camera can be transferred to a television receiver for displaying the image on a large screen or the file of an image can be transferred to a printer for printing out the image onto a piece of printing paper. In this way, the user can enjoy the taken image as a picture.

As a method to transfer an image (or other data) stored in a memory card already inserted into a source apparatus to another apparatus serving as a destination apparatus, in general, the memory card is pulled out from the source apparatus and mounted onto the other apparatus. As an alternative, the source apparatus containing the memory card is connected to the destination apparatus by using either of a cable and radio means, which can each be used for transferring the file of a taken image or data from the source apparatus to the destination apparatus. In particular, if the radio communication is adopted, data can be transferred without the work to set connectors and attach a cable to the connectors each time data is transferred, hence, enhancing convenience.

FIG. 9 is a diagram showing typical transfers of an image by radio communication from a mobile apparatus containing a memory card to an information apparatus. In the figure, a digital camera is used as the mobile apparatus. In the digital camera, a taken image is stored in an embedded memory or an external memory card as image data. In a process to transmit the image data by radio communication, the data to be transmitted is read out from the embedded memory or the external memory card and then transmitted to the information apparatus serving as an image reproduction apparatus such as a PC, a television or a printer by way of a radio interface module. Of course, the image reproduction apparatus such as a PC, a television or a printer on the reception side also has a radio interface module serving as an adapter. After the image data is transmitted through a radio transmission line, the recipient PC displays the image and typically stores the data. In the case of a television serving as the information reproduction apparatus, the image is displayed on the screen. In the case of a printer serving as the information reproduction apparatus, the image is printed out on a piece of printing paper.

In order to carry out the data radio transmission shown in the figure, it is necessary to provide the digital camera serving as the source of transmitted data with a radio interface module. If the source of transmitted data is an apparatus having no radio interface module, it is necessary to provide the source of transmitted data with a radio interface module including typically an external adapter. In addition, as a radio transmission function used in transmission of data, Bluetooth communication or a radio LAN such as a LAN conforming to typically the IEEE802.11 standard can be assumed.

For example, external memory media having an embedded radio communication function has been proposed. For more information on such external memory media, refer to documents such as Japanese Patent Laid-open No. 2001-77878, which is used as patent reference 1. This external memory media has a wire communication section and a short-distance radio communication section. The wire communication section is a section for exchanging data with a host apparatus, to which the external memory media is attached, by way of a physical connection section. On the other hand, the short-distance radio communication section is a section for exchanging data with a communication network by way of a short-distance radio communication network such as a Bluetooth-communication network. Thus, by mounting such external memory media on the digital camera serving as the source of transmitted data as well as serving as a host apparatus, the short-distance radio communication section included in the media can be driven to exchange data with the communication network.

FIG. 10 is a block diagram showing a typical configuration of a memory card having a radio communication function. In the diagram, reference numeral 100 denotes the memory card having a radio communication function and reference numeral 101 denotes a host apparatus such as a digital camera. Reference numeral 102 denotes an external apparatus serving as a data transmission destination such as a printer or serving as a data output destination such as a television monitor.

The memory card 100 includes a flash memory 106, a memory control section 107 and a interface section 108. The flash memory 106 is a unit serving as the basic function of the memory card 100. The interface section 108 is a unit for interfacing with the host apparatus 101. The memory card 100 also has a radio section 104 for carrying out typically Bluetooth communications and a communication control section 105 for controlling the radio section 104. To be more specific, the communication control section 105 is a unit for controlling a communication protocol of radio communication. Reference numeral 103 denotes an antenna provided on the memory card 100 and reference numeral 109 denotes an antenna provided on the external apparatus 102.

Normally, the host apparatus 101 makes an access to the flash memory 106 by way of the interface section 108 and the memory control section 107 in order to store data into the flash memory 106 and read out data from the flash memory 106. In a process to transmit an image stored in the flash memory 106 to the external apparatus 102, first of all, the host apparatus 101 makes an access to the flash memory 106 by way of the interface section 108 and the memory control section 107 in order to read out data of the image from the flash memory 106. Then, the host apparatus 101 transmits the data to the external apparatus 102 serving as the data transmission destination by way of the interface section 108, the communication control section 105, the radio section 104 and the antenna 103.

In this case, in order to implement the radio communication, it is necessary to control a radio communication function according to a predetermined communication protocol such as the Bluetooth communication or the IEEE802.11 standard. In the case of the typical configuration shown in FIG. 10, in the host apparatus 101 with a radio interface module mounted thereon, it is necessary to install driver software for driving a radio communication function of the radio interface module in accordance with a protocol. By the radio interface module, the memory card 100 is implied. That is, the radio communication function of the radio interface module is the communication control section 105. Installing such driver software is a cumbersome load that must be borne by the user.

In addition, in some cases, it may be impossible to install driver software in a digital camera, other mobile apparatus or other built-in apparatus. In this case, even if external memory media including the radio communication function is mounted on the host apparatus, the radio communication function cannot be used. As a result, in order to transfer data stored in the memory card 100 to the external apparatus 102, it is necessary to adopt the conventional method whereby the memory card 100 itself must be taken to the external apparatus 102 or connect the host apparatus 101 to the external apparatus 102 by using a cable for transferring the data from the host apparatus 101 to the external apparatus 102.

On top of that, an operation related to the communication processing must be carried out through a user interface of the digital camera on which the memory card 100 has been mounted and such an operation is troublesome. An example of the operation related to the communication processing is to select a file to be transferred.

Furthermore, manufacturers of memory cards need to provide several types of memory card to form a complete line of commodities. For example, the manufacturers must produce memory cards with different storage capacities of the flash memories included therein or memory cards with or without a copyright protection function. By the same token, the manufacturers of memory cards need to provide several types of the memory card having a radio communication function. That is to say, for example, the manufacturers must produce such memory cards with different storage capacities of the flash memories or such memory cards with or without a copyright protection function.

The greater the number of commodity lines, however, the more complicated the problem faced by the manufacturers of memory cards and the heavier the load borne by the manufacturers to manage the commodities. In addition, from the user point of view, purchasing a plurality of memory cards means purchasing duplicated radio communication sections with the exactly same function, arousing a feeling to buy a product at a high price.

SUMMARY OF THE INVENTION

Inventors of the present invention have devised an excellent memory unit, which is provided with a radio communication function and hence capable of transmitting data stored in a memory device employed therein by radio communication to an external apparatus.

The inventors of the present invention have also devised another excellent memory unit capable of transmitting data stored in a memory device employed therein to an external apparatus with ease without relying on operations carried out on a host apparatus, on which the memory unit has been mounted.

The inventors of the present invention have also devised a further excellent memory unit capable of transmitting data stored in a memory employed therein to an external apparatus by radio communication without the need to install driver software for controlling communications in a host apparatus, on which the memory unit has been mounted.

The inventors of the present invention have also devised a still further excellent memory unit capable of reducing a load borne by a manufacturer of the memory unit to offer a plurality of product lines in providing the memory card with a radio communication function and capable of preventing a user purchasing a plurality of commodities from having a feeling to purchase the commodities at a high price.

In accordance with a first embodiment of the present invention addressing the problems described above, there is provided an adapter for accommodating a memory card. The memory-card adapter has:

an insertion section for allowing a memory card to be inserted into the insertion section in such a state that the memory card can be mounted on the adapter and dismounted from the adapter with a high degree of freedom;

a wire communication section joined to a host apparatus in such a state that the wire communication section can be connected to the host apparatus and disconnected from the host apparatus with a high degree of freedom;

a radio communication section for carrying out communications with an external apparatus through a radio transmission line;

a communication control section for controlling communications carried out by the radio communication section; and a card interface section for passing on an access made by the host apparatus connected to the wire communication section and an access made by the communication control section as accesses to the memory card, which has been inserted into the insertion section.

In addition, in accordance with a second embodiment of the present invention, there is provided a memory unit including a memory card and an adapter for accommodating the memory card wherein:

the memory card has:
a memory section used for storing data;
a memory control section for controlling accesses to the memory section; and
an adapter interface section connected to the adapter; whereas
the adapter has:
an insertion section for allowing the memory card to be inserted into the insertion section in such a state that the memory card can be mounted on the adapter and dismounted from the adapter with a high degree of freedom;
a wire communication section joined to a host apparatus in such a state that the wire communication section can be connected to the host apparatus and disconnected from the host apparatus with a high degree of freedom;
a radio communication section for carrying out communications with an external apparatus through a radio transmission line;
a communication control section for controlling communications carried out by the radio communication section; and
a card interface section for passing on accesses made by the host apparatus connected to the wire communication section and accesses made by the communication control section to the memory card, which has been inserted into the insertion section.

In the adapter described above, the radio communication section is capable of carrying out communications to transmit data read out from the memory card already inserted into the insertion section to the external apparatus through a radio transmission line independently of the host apparatus connected to the wire communication section.

Most main information apparatus each have interfaces such as a card slot and a connector, which allow a cartridge memory device to be mounted onto the apparatus and dismounted from the apparatus with a high degree of freedom. Examples of the cartridge memory device are a memory card and a USB memory. By providing the memory card of this type with a short-distance radio communication section, data can be transferred without the work to set connectors and attach a cable to the connectors each time data is transferred, hence, enhancing convenience. However, it is necessary to install driver software for driving a radio communication function of the memory-card module in accordance with a protocol, and installing such driver software is a cumbersome load that must be borne by the user.

In addition, manufacturers of memory cards need to provide several types of memory card to form a complete line of commodities. For example, the manufacturers must produce memory cards with different storage capacities. By the same token, the manufacturers of memory cards need to provide several types of the memory card having a radio communication function. The greater the number of commodity lines, however, the heavier the load borne by the manufacturers to manage the commodities. In addition, from the user point of view, purchasing a plurality of memory cards means purchasing duplicated radio communication sections with the exactly same function, causing the user to feel that the user is buying a product at a high price.

On the other hand, the memory unit according to the present invention includes a memory card and an adapter for accommodating the memory card not provided with a radio communication function, which is included in the adapter. Independently of the host apparatus connected to the wire communication section employed in the adapter, the radio communication function can be carried out to transmit data read out from the memory card inserted into the adapter to the external apparatus.

At a request made by the external apparatus such as a PC, a television or a printer through a radio transmission line as a request for data, the adapter reads out the data from the memory section employed in the memory card in accordance with control executed by the communication control section employed in the adapter. The operation to transmit data read out from the memory card to the external apparatus at the request made by the external apparatus as a request for the data can thus be carried out without the need to install driver software for controlling communications in the host apparatus such as a digital camera on which the memory unit has been mounted. In other words, the present invention can be applied to the contemporary digital camera.

In addition, since the memory card is not provided with a radio communication function, the size of the memory card can be made smaller. Thus, the memory unit with a memory card thereof inserted in the adapter of the memory unit has the same size as the conventional memory card provided with a radio communication function and sustains card-slot compatibility with conventional products.

Typical compact memory cards used in the memory unit by being inserted into the adapter employed in the memory unit as described above include MEMORYSTICK DUO (a registered trademark) and a mini SD card. In the case of MEMORYSTICK DUO, the radio communication function is embedded in the adapter having the same size as MEMORYSTICK DUO and MEMORYSTICK DUO is used as the memory card. Also in the case of MEMORYSTICK DUO, independently of the host apparatus, the adapter reads out data from MEMORYSTICK DUO and transmits the data to the external apparatus through a radio transmission line.

Product lines of the memory unit according to the present invention are determined by the storage capacity of the memory section employed in the memory card in addition to copyright-protection and other functions. However, the adapter itself is a component common to the product lines. Thus, the load borne by the manufacturer of the memory card can be reduced.

In addition, the user can additionally purchase only the memory card if necessary. This is because, once the user purchases an adapter, the adapter can be used in conjunction with each of additionally purchased memory cards to carry out the radio communication function. Thus, the cost borne by the user can also be reduced.

On top of that, as a radio transmission system for carrying out communications between the adapter and the external apparatus, it is possible to adopt a reflected wave signal transmission method whereby a received electric wave signal is modulated before being reflected. To put it concretely, on the basis of data to be transmitted, the adapter modulates an electric wave signal received from the external apparatus to generate a reflected wave signal, and then transmits the reflected wave signal to the external apparatus. In accordance with such a reflected wave signal transmission method, the received electric wave signal is modulated to generate the reflected wave signal by merely, for example, carrying out switching operations to vary the load impedance of the antenna or give phase variations to the reflected wave signal.

Moreover, the card interface section controls accesses to the memory card in accordance with the state of connection of the radio communication section. To put it in detail, the card interface section avoids contentions about an access to the memory card by selectively allowing only an access made by either the host apparatus connected to the wire communication section or an access made by the communication control section. To put it concretely, while the communication control section is making an access to the memory card, the card interface section prohibits an access made by the host apparatus connected to the wire communication section. Thus, it is possible to get rid of a malfunction caused by a contention about the memory card due to an access made by the host apparatus connected to the wire communication section at the same time as an access made by the communication control section. It is also possible to assure that an access can be made smoothly to the memory card through the radio transmission line. It is needless to say that, while the host apparatus is transferring data to the memory card, the card interface section prohibits an access made by the communication control section as an access to the memory card.

By the way, the memory unit runs a risk of having a radio communication interrupted while the radio communication is being implemented as an operation different from a communication operation through the wire communication line. Thus, in order to get rid of a problem caused by such a risk, the card interface section accepts only a request received from the communication control section as a request for an operation to read out data from the memory card but turns down a request received from the communication control section as a request for an operation to write data into the memory card.

In accordance with the present invention, it is possible to provide an adapter for accommodating a memory card as an adapter having a radio communication function allowing data stored in the memory card to be properly transmitted to an external apparatus by radio communication and provide a memory unit including the memory card and the adapter.

In addition, in accordance with the present invention, it is possible to provide an adapter for accommodating a memory card as an adapter capable of transmitting data stored in the memory card to an external apparatus with ease independently of operations carried out by a host apparatus and provide a memory unit to be mounted in the host apparatus as a memory unit including the memory card and the adapter.

On top of that, in accordance with the present invention, it is possible to provide an adapter for accommodating a memory card as an adapter capable of transmitting data stored in the memory card to an external apparatus properly without the need to install driver software for controlling communications in a host apparatus and provide a memory unit to be mounted in the host apparatus as a memory unit including the memory card and the adapter.

Furthermore, in accordance with the present invention, it is possible to provide an adapter for accommodating a memory card as an adapter capable of reducing a load borne by the manufacturer as a load to provide a plurality of product lines and capable of preventing the user purchasing a plurality of products from feeling that the user is buying the products at a high price and provide a memory unit including the memory card and the adapter.

As described above, the memory unit according to the present invention includes a memory card and an adapter into which the memory card is inserted. The adapter has a radio communication function. At a request made by an external apparatus such as a PC, a television or a printer through a radio transmission line as a request for data, the adapter reads out the data from a memory section employed in the memory card in accordance with control executed by a communication control section employed in the adapter. The operation to transmit data read out from the memory card to the external apparatus at the request made by the external apparatus as a request for the data can be carried out without the need to install driver software for controlling communications in a host apparatus such as a digital camera on which the memory unit has been mounted. Thus, the following effects can be obtained.

(1): A mobile apparatus such as a digital camera is capable of transmitting an image generated by the mobile apparatus and stored in the memory card to an external apparatus through a radio transmission line without the need to specially modify the mobile apparatus by for example installing a driver in the mobile apparatus.

(2): The manufacturer of the mobile apparatus does not have to develop a mobile apparatus including an embedded radio communication function. Thus, the manufacturer can shorten the development time.

(3): Product lines of the memory unit are determined by the storage capacity of the memory section employed in the memory card. Since the adapter itself is a component common to the product lines, however, the load borne by the manufacturer of the memory card can be reduced.

(4): The user can additionally purchase only a memory card if necessary. This is because, once the user purchases an adapter, the adapter can be used in conjunction with each of additionally purchased memory cards to carry out the radio communication function. Thus, the cost borne by the user can also be reduced.

By adopting a reflected wave signal transmission method whereby a received electric wave signal is modulated before being reflected in a radio communication with an external apparatus, the size of the radio communication section can be reduced and the power consumed in communications can be decreased substantially.

Other objects of the present invention, its characteristics and merits thereof can probably be better understood from the following detailed description of an embodiment of the present invention with reference to accompanying diagrams.

DETAILED DESCRIPTION OF THE PREFFERRED EMBODIMENTS

An embodiment of the present invention is explained in detail by referring to diagrams as follows.

Figure 1:
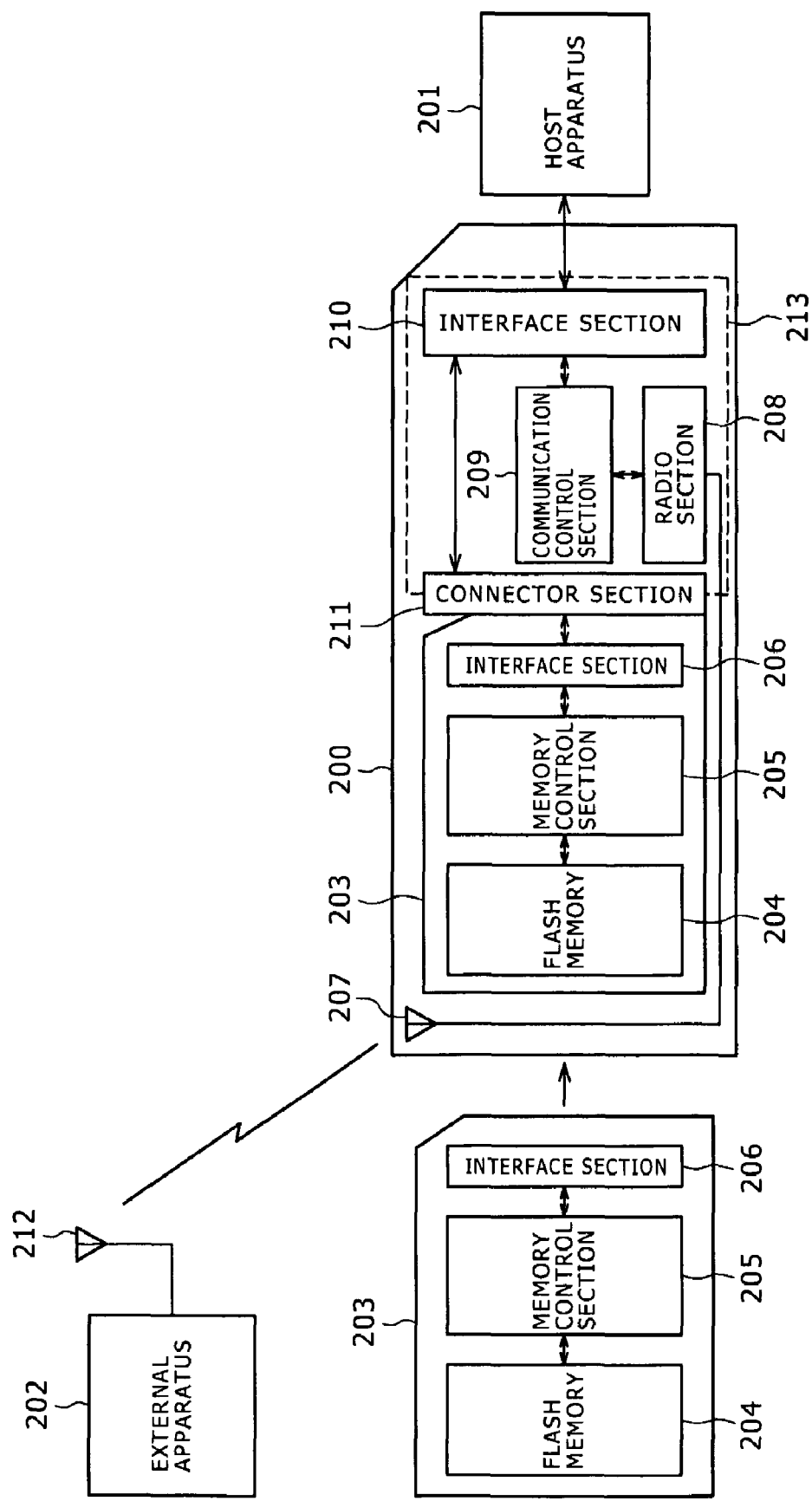
FIG. 1 is a diagram showing a model of a typical configuration of a radio transmission system according to an embodiment of the present invention.

FIG. 1 is a diagram showing a model of a typical configuration of a radio transmission system according to an embodiment of the present invention. In the figure, reference numeral 200 denotes a memory-card adapter for accommodating a memory card. The memory-card adapter 200 has a radio communication function. Reference numeral 201 denotes a host apparatus such as a digital camera. The host apparatus 201 is an apparatus on which the memory-card adapter 200 is mounted in a replaceable state. Reference numeral 202 denotes an external apparatus serving as a data transfer destination. Examples of the external apparatus 202 are a television and a printer. Reference numeral 212 denotes an antenna provided on the external apparatus 202.

The memory-card adapter 200 has a slot not shown in the figure. A small-size memory card 203 is inserted into the slot freely in order to place the small-size memory card 203 in the memory-card adapter 200. The slot also allows the small-size memory card 203 to be pulled out from the memory-card adapter 200 with a high degree of freedom. The host apparatus 201 also has a slot not shown in the figure. The memory-card adapter 200 including the small-size memory card 203 inserted therein can be inserted into the slot of the host apparatus 201 freely in order to place the memory-card adapter 200 in the host apparatus 201. The slot of the host apparatus 201 also allows the memory-card adapter 200 to be pulled out from the host apparatus 201 with a high degree of freedom. Typically, the memory-card adapter 200 has a small size and is compatible with the conventional memory card and the slot of the conventional host apparatus.

The memory-card adapter 200 having a radio communication function includes a radio communication function 213, a interface section 210 and a connector section 211. The interface section 210 is an interface through which data is exchanged between the memory-card adapter 200 and the host apparatus 201. The connector section 211 is a connector for connecting the memory-card adapter 200 to the small-size memory card 203. Typically, the connector section 211 is placed on the innermost portion of the slot into which the memory card 203 having a small size is inserted. The radio communication function 213 has a radio section 208 and a communication control section 209. In addition, the memory-card adapter 200 also has an antenna 207 connected to the radio section 208. Typically, the antenna 207 is a mono-pole antenna. The antenna 207 exhibits a specific directional characteristic and a characteristic of polarized electromagnetic radiation through the opening of the slot provided on the memory-card adapter 200. Not shown in the figure, the slot of the host apparatus 201 is used for mounting the memory-card adapter 200 on the host apparatus 201 as described before.

As a radio communication interface, the radio section 208 is capable of carrying out typically IEEE802.11 or Bluetooth communications, which conform to specifications and standard of a radio LAN, or reflected wave signal transmissions. The reflected wave signal transmission is a back scatter communication in which, on the basis of data to be transmitted, the radio section 208 modulates an electric wave signal received from the external apparatus 202 to generate a reflected wave signal. In this case, the received electric wave signal is modulated to generate the reflected wave signal by merely, for example, carrying out switching operations to vary the load impedance of the antenna 207 or give phase variations to the reflected wave signal. If the reflected wave signal transmission is adopted as the radio communication, the radio section 208 is designed as a reflector. In this case, for example, data requested in page units is transmitted to the external apparatus 202 as a reflected electric wave signal obtained as a result of a process to modulate an electric wave signal received from the external apparatus 202. Since the data is transmitted to the external apparatus 202 under control executed by the external apparatus 202 serving as a reflected wave signal reception apparatus, the memory-card adapter 200 employing the radio section 208 is capable of getting rid of a problem caused by a change of a communication protocol version as a problem of a device driver.

The small-size memory card 203 has a flash memory 204, a memory control section 205 and an interface section 206. The flash memory 204 is a memory device providing a storage space used for storing data. The memory control section 205 is a component for making an access to the storage space. The interface section 206 is also a component for communicating data with the memory-card adapter 200 accommodating the small-size memory card 203. The flash memory 204 is generally accessed with a page used as the smallest access unit. A predetermined number of pages composes a block. The memory control section 205 is capable of making an access to data at an address represented by a specified block number and a specified page number of a page in a block indicated by the block number.

Figure 2:
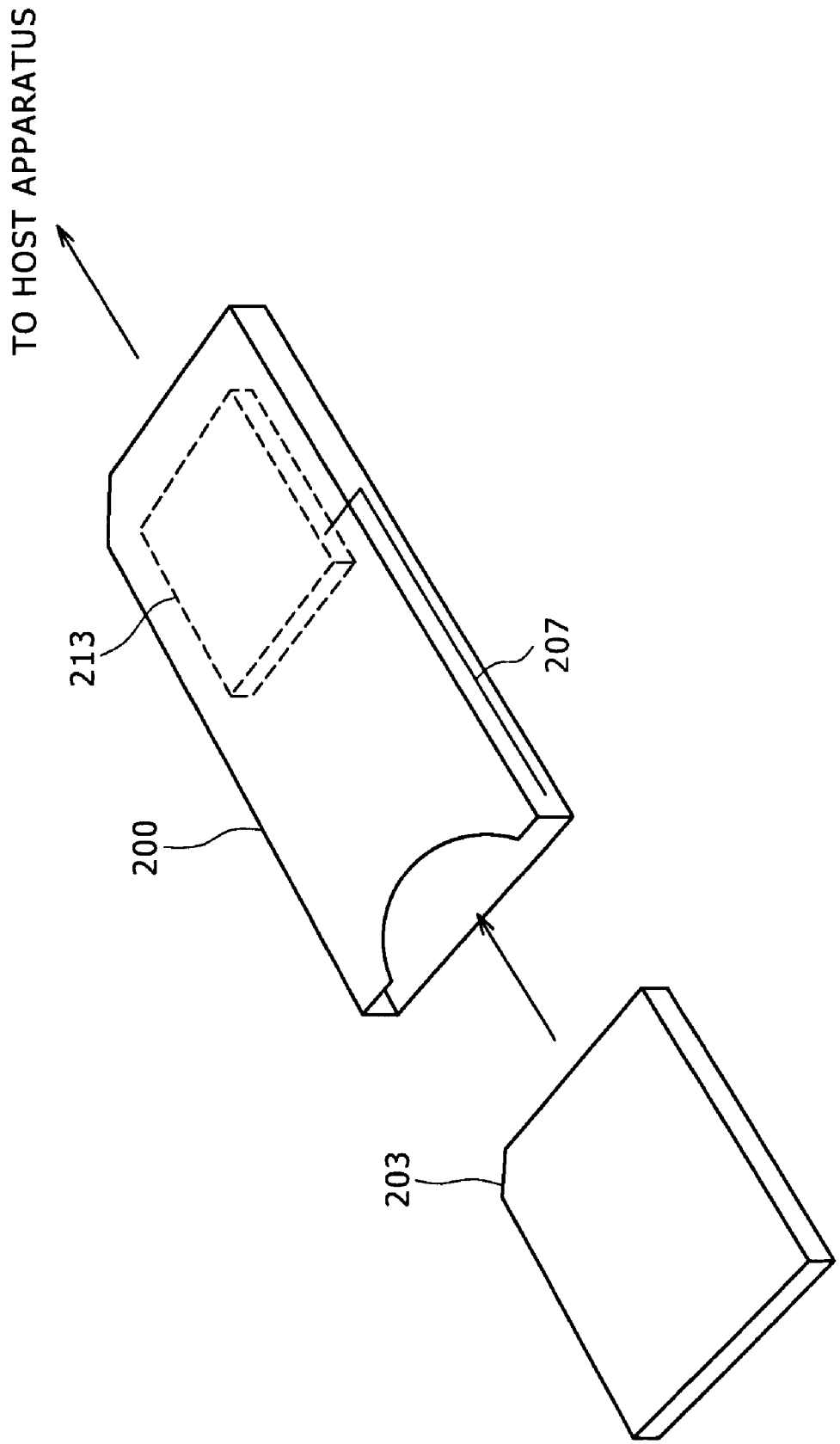
FIG. 2 is an external-view diagram showing an operation to insert a small-size memory card 203 into a memory-card adapter 200 having a radio communication function.

The small-size memory card 203 is inserted into the memory-card adapter 200 having a radio communication function to be engaged with and connected to the connector section 211. FIG. 2 is an external-view diagram showing an operation to insert the small-size memory card 203 into the memory-card adapter 200 having a radio communication function. As shown in the figure, the memory-card adapter 200 having a radio communication function is provided with the radio communication function 213 and the antenna 207.

Normally, the host apparatus 201 is capable of making an access to the flash memory 204 employed in the small-size memory card 203 by way of the interface section 210 and the connector section 211, which are employed in the memory-card adapter 200 having a radio communication function. If the host apparatus 201 is a digital camera, for example, the host apparatus 201 is thus capable of writing a taken image into the flash memory 204 and reading out an image from the flash memory 204. In addition, the memory-card adapter 200 having a radio communication function receives driving power supplied by the host apparatus 201 by way of the interface section 210.

The radio section 208 is capable of carrying out radio communications in accordance with control executed by the communication control section 209. In addition, the radio section 208 is also capable of making an access to an image stored in the flash memory 204 of the small-size memory card 203 by way of the memory control section 205 employed in the small-size memory card 203. However, unlike the interface section 210, a radio transmission line including the radio section 208 faces a risk of being interrupted while a radio communication is being implemented. Thus, in order to get rid of a problem caused by such a risk, the memory control section 205 accepts only a request received from the radio section 208 as a request for an operation to read out data from the flash memory 204 but turns down a request received from the radio section 208 as a request for an operation to write data into the flash memory 204.

For example, a control signal is transmitted by radio communication from the antenna 212 employed in the external apparatus 202. In response to this control signal, the memory-card adapter 200 mounted on the host apparatus 201 as an adapter having a radio communication function transmits a response signal 104 by radio communication. The response signal 104 is typically a JPEG image read out from the small-size memory card 203. The JPEG image is an image taken by the host apparatus 201. Then, the external apparatus 202 is capable of displaying the image on a television screen or printing out the image on a piece of printing paper.

As described above, the radio communication function 213 is embedded in the memory-card adapter 200 as a function for reading out data from the flash memory 204 employed in the small-size memory card 203 independently of the host apparatus 201 such as a digital camera in order to solve problems such as the need to install a device driver in the host apparatus 201, the need to increase the number of product lines for the small-size memory card 203 and the need to impose a high price on the user.

The radio section 208 used as radio communication interface connecting the memory-card adapter 200 having a radio communication function to the external apparatus 202 is capable of carrying out typically IEEE802.11 or Bluetooth communications, which conform to specifications and standard of a radio LAN, or reflected wave signal transmissions.

The radio LAN is developed and designed by assuming that the LAN will be used originally for computers. Thus, if the memory-card adapter 200 is mounted on the host apparatus 201, which is a mobile apparatus, the memory-card adapter 200 will have a problem of too much power consumption. Most contemporary radio LAN cards put in the market as cards conforming to the IEEE802.11b standard have a transmission power consumption of at least 800 mW and a reception power consumption of at least 600 mW. These power consumptions are a big load for a portable apparatus driven by a battery.

Even if the radio LAN function is carried out by limiting the function to short-distance applications only in order to reduce the power consumptions, the power consumptions cannot be reduced substantially. In particular, means for carrying out radio transmissions at a low power consumption is even demanded for communications of a high transmission rate, that is, communications in which a transmission of data from an image input apparatus such as a digital camera to an image display apparatus occupies almost the entire communication.

In the case of the Bluetooth communication, the maximum transmission speed is 720 kbps. Since this maximum transmission speed is low, it takes long time to transmit a contemporary image with a high picture quality. Thus, the Bluetooth communication is inconvenient for such image transmissions.

In the case of the reflected wave signal communication method for applying a back-scatter transmission to a reflected wave signal obtained as a result of a process carried out by a reflector to modulate a received electric wave signal so as to provide a high transmission rate on the reflector side, on the other hand, reduction of the power consumption can be implemented. As described above, the high transmission rate on the reflector side implies that a transmission of data from the reflector to the reflected wave signal reception apparatus occupies almost the entire communication.

A reflected wave signal transmission system includes a reflector and a reflected wave signal reception apparatus. The reflector is an apparatus for transmitting data by using a reflected wave signal obtained as a result of a process carried out by the reflector to modulate an electric wave signal, which is received from the reflected wave signal reception apparatus. On the other hand, the reflected wave signal reception apparatus is also an apparatus for reading out the data from the reflected wave signal transmitted by the reflector. The electric wave signal received by the reflector from the reflected wave signal reception apparatus is an unmodulated carrier. Typically, in accordance with data to be transmitted to the reflected wave signal reception apparatus, the reflector carries out a process to modulate the unmodulated carrier received from the reflected wave signal reception apparatus by changing a load impedance, generating a reflected wave signal in order to transmit the data conveyed in the reflected wave signal to the reflected wave signal reception apparatus. For example, the reflector varies the load impedance by turning on and off a switch connecting a terminator of an antenna of the reflector to the antenna. The reflected wave signal reception apparatus is capable of acquiring the transmitted data from the reflected wave signal by carrying out processes to demodulate and decode the reflected wave signal. Typically, the reflector includes the antenna mentioned above, a transmitted-data generation circuit and an impedance-varying circuit. The antenna is an antenna for reflecting a received signal of consecutive electric waves. The impedance-varying circuit is a circuit for varying the impedance of the antenna in accordance with data generated by the transmitted-data generation circuit as data to be transmitted. For more information, refer to documents such as Japanese Patent Laid-open No. Hei 01-182782.

An antenna switch employed by the reflector in the reflected wave signal transmission system as a switch for varying the impedance of the antenna, that is, a switch for modulating the reflected electric wave signal, is generally an IC made of gallium arsenic. The gallium-arsenic IC has a power consumption not exceeding several tens of microwatts. To be more specific, in the case of a receipt confirmation method, the average power consumption is not greater than 10 mW. In the case of simplex transmissions, on the other hand, data can be transferred at a power consumption not exceeding several tens of microwatts. In comparison with the average power consumption of the ordinary radio LAN, these power consumptions prove extraordinary performance. For more information, refer to documents such as Japanese Patent Laid-open No. 2003-291809. Thus, even if the information storage terminal such as the memory-card adapter according to the present invention is mounted on a battery-driven mobile apparatus such as a digital camera, the life of a battery providing power to the mobile apparatus can be substantially prolonged by the reduction of the power consumed at the time data is transmitted to the reflected wave signal reception apparatus.

In the case of the reflected wave signal transmission described above, the radio section 208 employed in the memory-card adapter 200 is designed as a reflector for transmitting data requested by the reflected wave signal reception apparatus in page units or the like to the reflected wave signal reception apparatus as a reflected electric wave signal obtained as a result of a process to modulate an electric wave signal received from the reflected wave signal reception apparatus. Since the data is transmitted to the reflected wave signal reception apparatus in accordance with control executed by the reflected wave signal reception apparatus, the memory-card adapter 200 employing the radio section 208 is capable of completely getting rid of a problem caused by a change of a communication protocol version or the like as a problem of a device driver. Examples of the problem of a device driver are problems to install a new device driver and update an already installed device driver. In addition, the area of a module implementing the radio section 208 can be reduced considerably in comparison with a case in which a radio LAN is used.

The following description explains the configuration of the radio section 208 employed in the memory-card adapter 200 having a radio communication function and the configuration of a radio section employed in the external apparatus 202 in a reflected wave signal transmission system.

Figure 3:
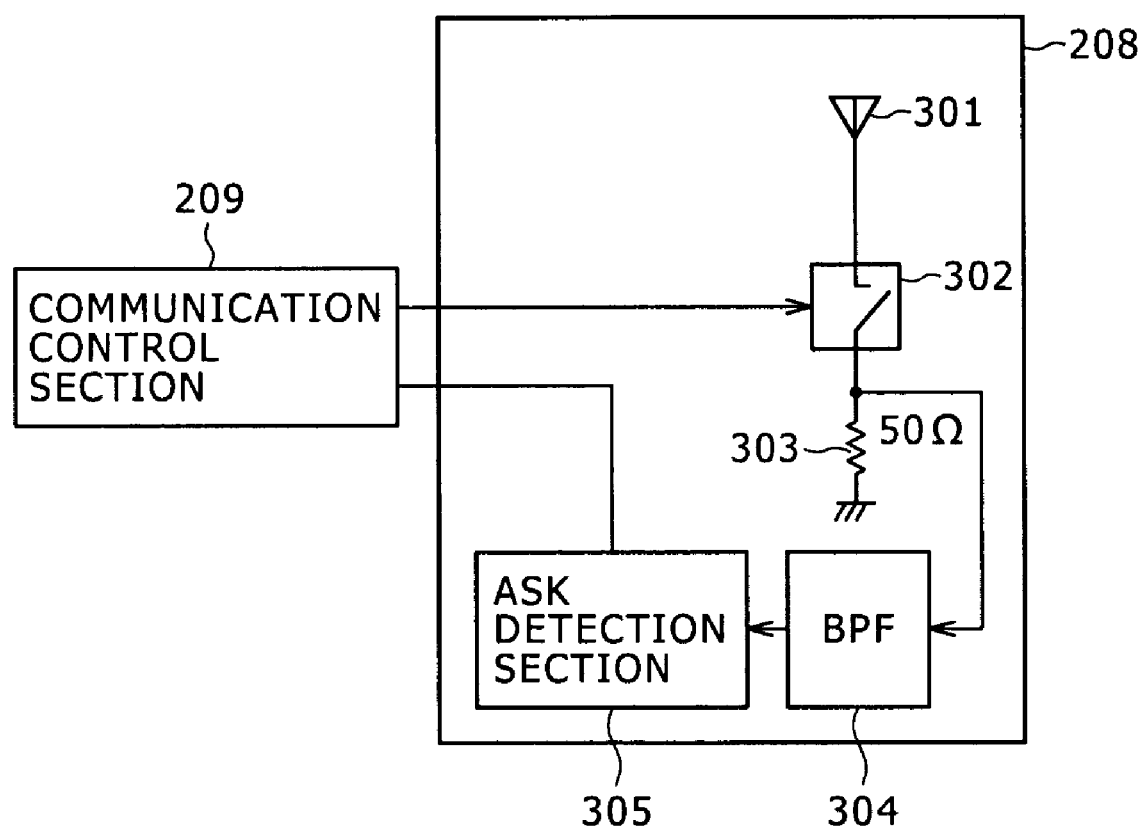
FIG. 3 is a block diagram showing the configuration of a radio section 208 employed in the memory-card adapter 200 having a radio communication function.

FIG. 3 is a block diagram showing the configuration of the radio section 208 employed in the memory-card adapter 200 having a radio communication function. As shown in the figure, the radio section 208 has an antenna 301, an antenna switch 302, an antenna load 303, a BPF (Band Pass Filter) 304 and an ASK detection section 305. In this embodiment, the frequency of the radio electric wave signal is 2.4 GHz. The radio electric wave signal of 2.4 GHz is referred to as an ISM.

Let us assume for example that an image stored in the flash memory 204 employed in the memory card 203 is transferred to the external apparatus 202. In this case, when the radio section 208 receives the image read out by the memory control section 205 also employed in the memory card 203 from the flash memory 204, the radio section 208 turns on and off the antenna switch 302 connected to the antenna 301 in accordance with a bit image of data representing the image. For example, if the bit of the data is 1, the antenna switch 302 is turned on. If the bit of the data is 0, on the other hand, the antenna switch 302 is turned off.

As shown in the figure, when the antenna switch 302 is turned on, the antenna 301 is connected to the antenna load 303, which is typically a resistor having a resistance of 50 ohms. When the antenna switch 302 is turned off, on the other hand, the antenna 301 is opened. When the antenna 301 is connected to the antenna load 303, an electric wave signal received from the reflected wave signal reception apparatus serving as the destination of the data transmission is terminated. When the antenna 301 is disconnected from the antenna load 303, on the other hand, an electric wave signal received from the reflected wave signal reception apparatus serving as the destination of the data transmission is reflected. Thus, the reflected wave signal reception apparatus is capable of fetching the transmitted image by detecting the reflected electric wave signal received from the radio section 208. That is to say, the image is basically transmitted from the radio section 208 to the reflected wave signal reception apparatus as a reflected wave signal obtained as a result of a process carried out by turning on and off the antenna switch 302 to vary a load impedance of the antenna 301 as a process to modulate an electric wave signal transmitted by the reflected wave signal reception apparatus. The reflected wave signal transmitted by the radio section 208 is equivalent to a wave signal completing an ASK-modulation process. However, the method to modulate the wave signal received from the reflected wave signal reception apparatus to generate the reflected wave signal transmitted to the reflected wave signal reception apparatus can be a PSK or FSK modulation method in addition to the ASK modulation method.

As described above, the antenna switch 302 is generally an IC made of gallium arsenic. The gallium-arsenic IC has a power consumption not exceeding several tens of microwatts. Thus, in accordance with the communication method described above, the image radio transmission can be implemented at a very low power consumption.

The BPF (band pass filter) 304 and the ASK detection section 305 are used in receiving a receipt confirmation signal completing an ASK modulation process from the transfer destination. These 2 blocks can be eliminated in the simplex transmission, which does not need to confirm a transmitted signal. If the receipt confirmation method is adopted, on the other hand, the ASK-modulated receipt confirmation signal is verified in accordance with control executed by the communication control section 209.

The BPF (band pass filter) 304 is employed with an objective to pass on a signal having a frequency of 2.4 GHz and attenuate signals having other frequencies. The power consumption of the ASK detection section 305 required in the receipt confirmation method can be suppressed to a value not greater than 30 mW.

Thus, the average power consumption required by the radio section 208 shown in FIG. 3 to transmit data such as an image is not greater than 10 mW for the receipt confirmation method and not greater than several tens of microwatts for the simplex transmission. In comparison with the average power consumption of the ordinary radio LAN, these power consumptions prove extraordinary performance. In addition, the area of a module implementing the radio section 208 can be reduced considerably in comparison with a case in which a radio LAN is used.

Figure 4:
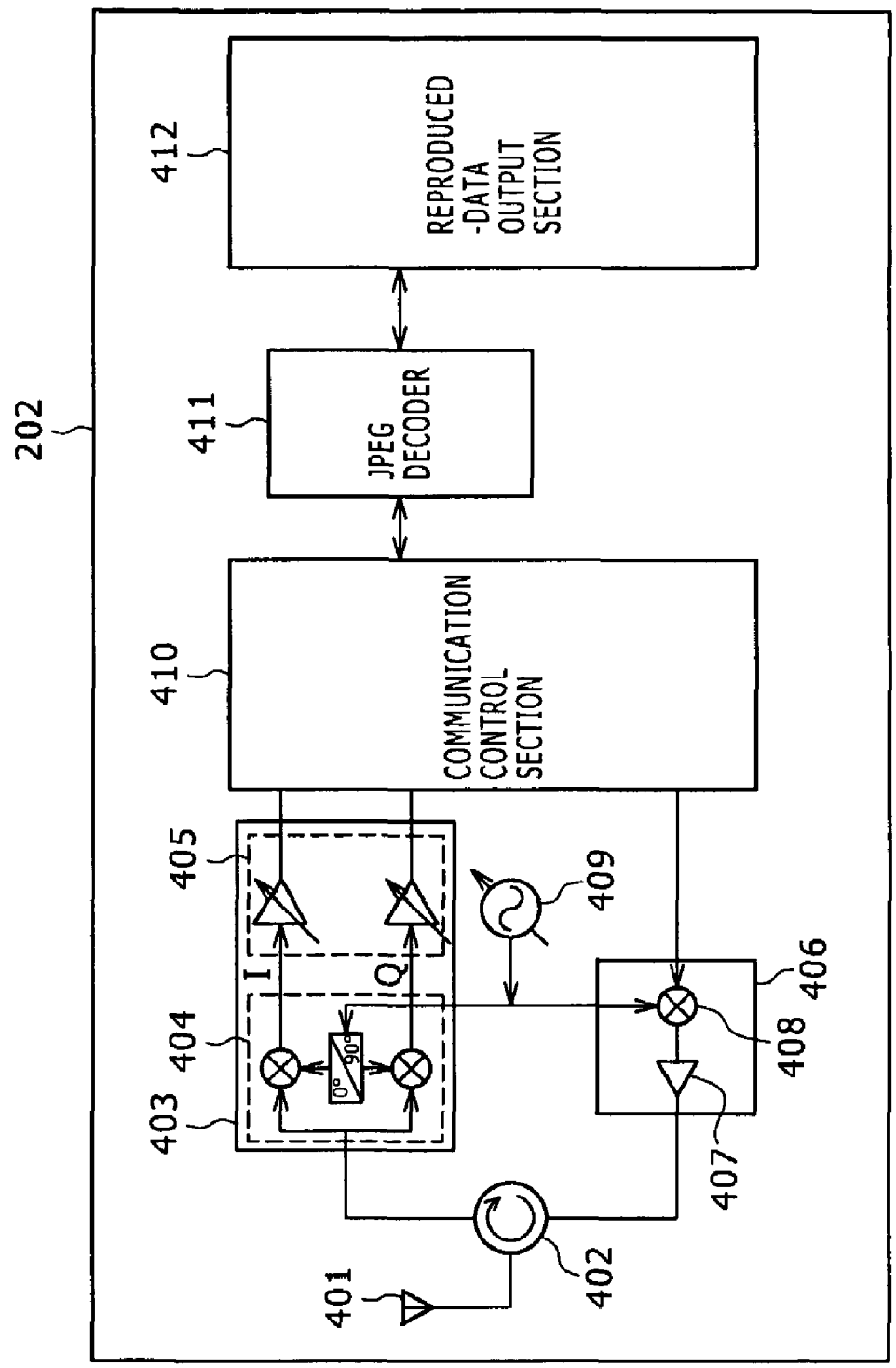
FIG. 4 is a diagram showing a model of a hardware configuration of a radio section employed in the external apparatus 202, which serves as the reflected wave signal reception apparatus in the reflected wave signal transmission system, as a radio communication interface.

FIG. 4 is a diagram showing a model of a hardware configuration of a radio section employed in the external apparatus 202, which serves as the reflected wave signal reception apparatus in the reflected wave signal transmission system, as a radio communication interface.

Since an image is transmitted from the memory-card adapter 200 having a radio communication function as a modulated reflected wave signal, the external apparatus 202 serving as the reflected wave signal reception apparatus needs to transmit an unmodulated carrier, which is to be modulated to generate the modulated reflected wave signal, to the memory-card adapter 200. As shown in the figure, the external apparatus 202 serving as the reflected wave signal reception apparatus includes a 2.4 GHz-band antenna 401, an antenna switch or a circulator 402 serving as a substitute for the antenna switch, a reception section 403, a transmission section 406 and a frequency synthesizer 409. The reception section 403 has an orthogonal detection section 404 and an AGC amplifier 405 whereas the transmission section 406 has a power amplifier 407 and a mixer 408.

In order to transmit the unmodulated carrier from the transmission section 406 to the memory-card adapter 200, it is necessary to apply a DC voltage generated by the communication control section 410 to the mixer 408. The frequency of the unmodulated carrier being transmitted to the memory-card adapter 200 is determined by the frequency of the frequency synthesizer 409, which is controlled by the communication control section 410. In this embodiment, the unmodulated carrier has a frequency of 2.4 GHz. This frequency of 2.4 GHz is referred to as an ISM as described before. The unmodulated carrier output by the mixer 408 is amplified by the power amplifier 407 to a predetermined level and transmitted to the memory-card adapter 200 by way of the circulator 402 and the 2.4 GHz-band antenna 401.

The frequency of the wave signal reflected by the memory-card adapter 200 having a radio communication function is the same as that of the frequency transmitted from the reflected wave signal reception apparatus. This reflected wave signal is received by the 2.4 GHz-band antenna 401 and supplied to the reception section 403 by way of the circulator 402. Since a local signal having the same frequency as that of the frequency transmitted from the reflected wave signal reception apparatus is also supplied to the orthogonal detection section 404 employed in the reception section 403, the orthogonal detection section 404 outputs a wave signal experiencing the ASK modulation process carried out at the radio section 208 employed in the memory-card adapter 200 having a radio communication function. Since the received signal has a phase different from that of the local signal, however, modulated signals according to the difference in phase appear on an I-axis signal and a Q-axis signal.

The gain of the AGC amplifier 405 is controlled to an optimum value. The I-axis and a Q-axis signals output by the AGC amplifier 405 are supplied to the communication control section 410. The communication control section 410 demodulates the I-axis and a Q-axis signals received from the AGC amplifier 405 to generate digital data. Correct digital data generated by the communication control section 410 is decoded by the JPEG decoder 411. Then, typically, the decoded data is further converted into an analog video signal, which is then supplied to a television not shown in the figure through a video cable. As an alternative, data representing an image is output to a printer also not shown in the figure to be printed out on a piece of printing paper.

If the receipt confirmation method is applied to data received from the memory-card adapter 200, the communication control section 410 supplies ACK (acknowledgement) digital data to the mixer 408 to indicate that the received packet data is correct. If the received packet data is erroneous, on the other hand, the communication control section 410 supplies NACK (negative acknowledgement) digital data to the mixer 408. A CRC (Cyclic Redundancy Check) code added to the image data packet is examined to determine whether the received packet data is correct or erroneous. The digital data supplied to the mixer 408 is subjected to an ASK modulation process.

Figure 5:
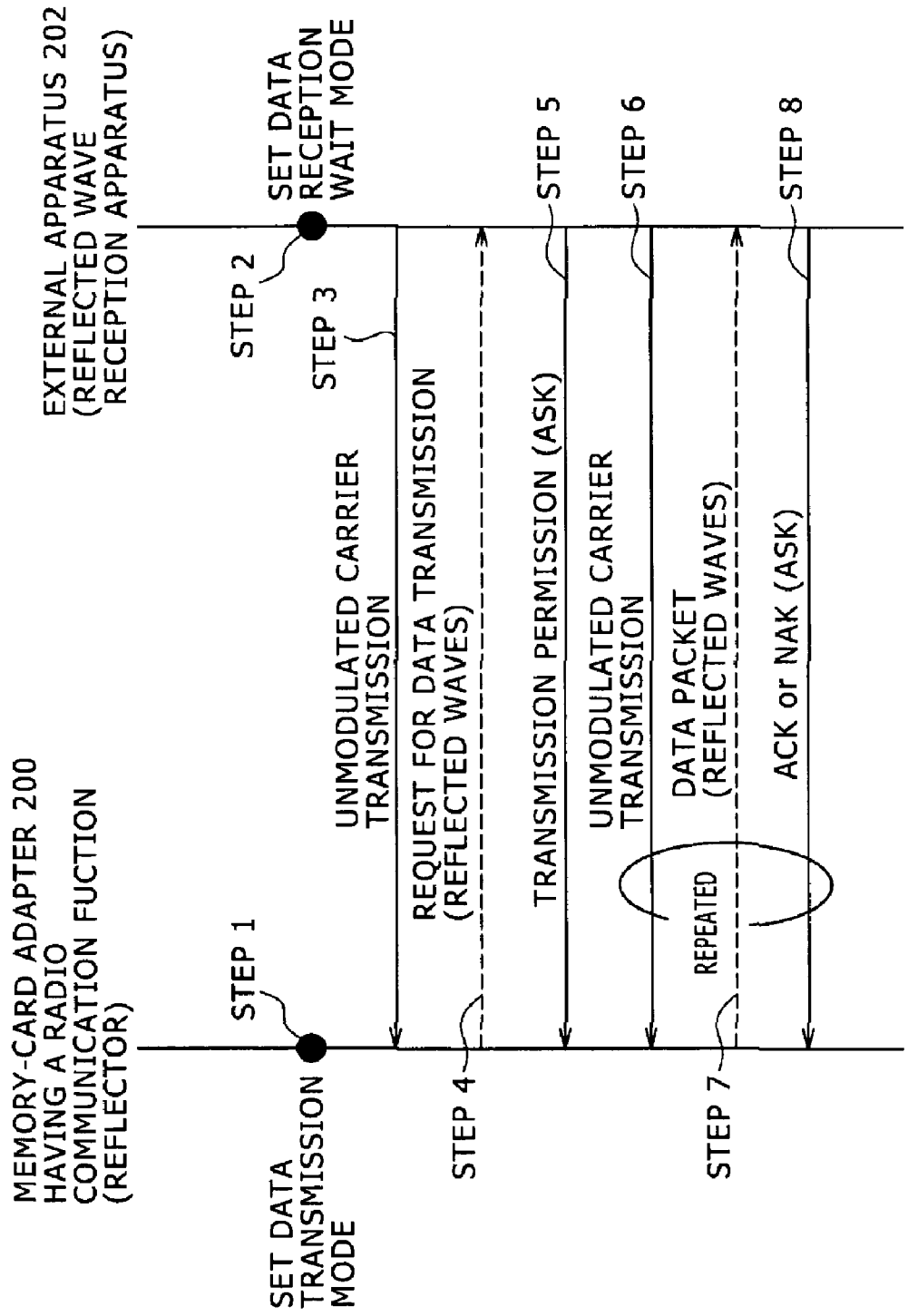
FIG. 5 is a diagram showing a typical control sequence applied to radio communications between the radio section 208 shown in FIG. 3 as a section employed in the memory-card adapter 200 having a radio communication function and the external apparatus 202 serving as the reflected wave signal reception apparatus as shown in FIG. 4.

FIG. 5 is a diagram showing a typical control sequence applied to radio communications between the radio section 208 shown in FIG. 3 as a section employed in the memory-card adapter 200 having a radio communication function and the external apparatus 202 serving as the reflected wave signal reception apparatus as shown in FIG. 4. In the typical control sequence shown in FIG. 5, however, it is assumed that the receipt confirmation method is applied to the communications between the memory-card adapter 200 and the external apparatus 202.

Step 1

The memory-card adapter 200 having a radio communication function changes the communication mode from a wire communication mode to a radio communication mode in accordance with a procedure for receiving a control signal from the external apparatus 202 serving as the reflected wave signal reception apparatus or in accordance with another procedure.

Step 2

By the same token, the external apparatus 202 serving as the reflected wave signal reception apparatus enters a data-waiting mode in accordance with a predetermined procedure.

Step 3

Then, the external apparatus 202 serving as the reflected wave signal reception apparatus transmits an unmodulated carrier to the memory-card adapter 200. The unmodulated carrier is a signal to be modulated by the memory-card adapter 200 having a radio communication function to generate a reflected wave signal.

Step 4

When the memory-card adapter 200 having a radio communication function receives the unmodulated carrier, the radio section 208 employed in the memory-card adapter 200 transmits a data transmission request revealing a desire to start an operation to transmit data by conveying the data on a reflected wave signal to the external apparatus 202.

Step 5

Receiving the data transmission request, the external apparatus 202 serving as the reflected wave signal reception apparatus transmits a transmission permission completing an ASK modulation process to the memory-card adapter 200.

Step 6

The external apparatus 202 serving as the reflected wave signal reception apparatus transmits an unmodulated carrier to the memory-card adapter 200. The unmodulated carrier is a signal to be modulated by the memory-card adapter 200 having a radio communication function to generate a reflected wave signal for conveying data to be transmitted from the memory-card adapter 200 to the external apparatus 202. Examples of the data to be transmitted from the memory-card adapter 200 to the external apparatus 202 are an image or a list of data files that can be transmitted from the memory-card adapter 200 to the external apparatus 202.

Step 7

Receiving the unmodulated carrier, the radio section 208 employed in the memory-card adapter 200 having a radio communication function modulates the carrier to generate a reflected wave signal conveying packet data to be transmitted to the external apparatus 202.

Step 8

The external apparatus 202 serving as the reflected wave signal reception apparatus transmits an ACK (acknowledgement) signal completing an ASK modulation process to the memory-card adapter 200 if received packet data is correct. If the received packet data is erroneous, on the other hand, the external apparatus 202 serving as the reflected wave signal reception apparatus transmits an NACK (negative acknowledgement) signal completing an ASK modulation process to the memory-card adapter 200. A CRC (Cyclic Redundancy Check) code added to the data packet is examined to determine whether the received packet data is correct or erroneous.

When the external apparatus 202 serving as the reflected wave signal reception apparatus transmits an ACK or NACK signal as a receipt confirmation signal to the memory-card adapter 200 having a radio communication function, the external apparatus 202 is allowed to include a command issued to the memory-card adapter 200 in the same signal as ACK or NACK.

Steps 6 to 8 are executed repeatedly till the transmission of all the desired data is completed.

Since an image is transmitted in the communication sequence described above, the duplex communication is adopted in order to apply the receipt confirmation method to the image. In the case of a transmission of streaming data from a video camera or the like to the external apparatus 202, the simplex communication may be adopted. In this case, since the external apparatus 202 serving as the reflected wave signal reception apparatus does not need to transmit a receipt confirmation signal completing an ASK modulation process, the memory-card adapter 200 mounted on the video camera or the like as an adapter having a radio communication function does not have to prepare itself to receive such a signal. Thus, further reduction of the power consumption can be implemented.

Figure 6:
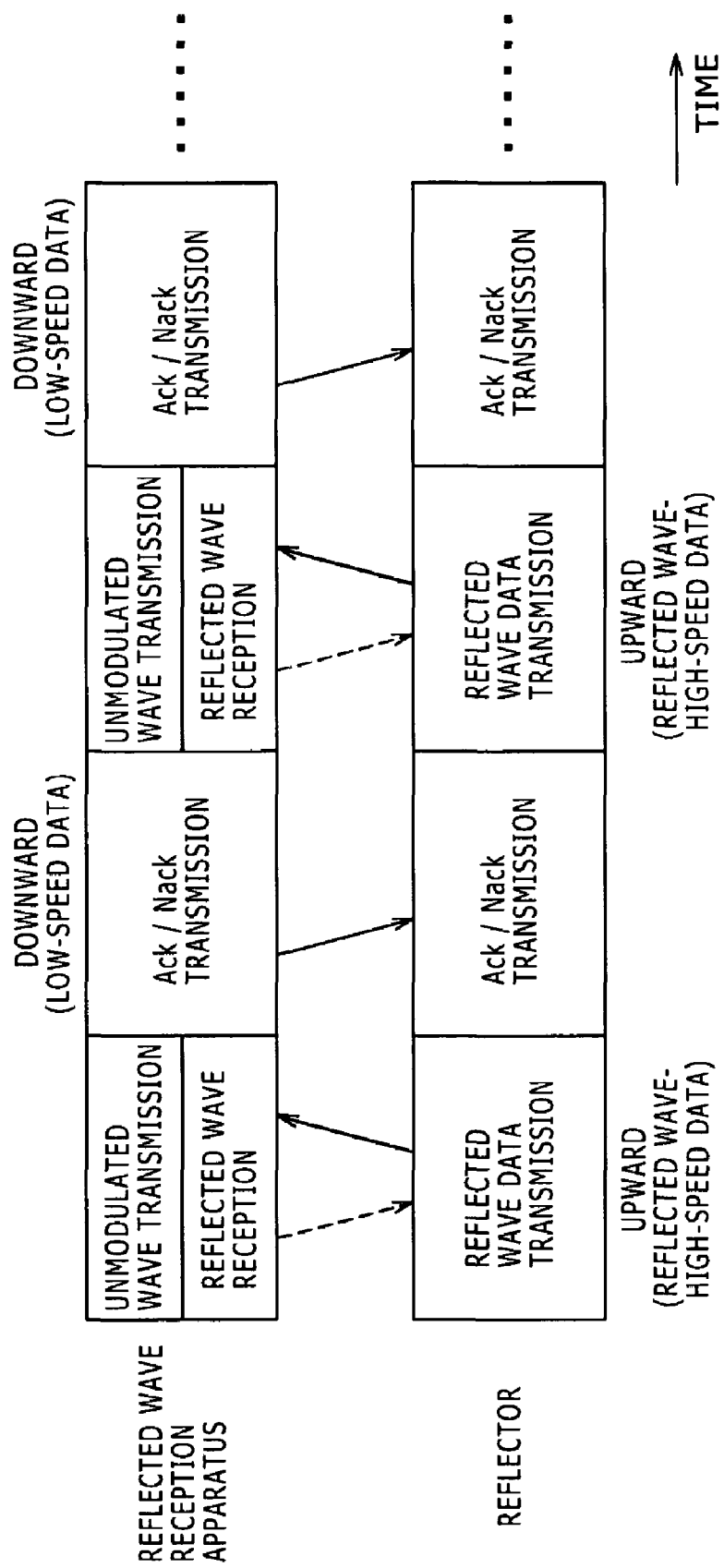
FIG. 6 is a diagram showing typical operations carried out in a reflected wave signal transmission system adopting the a TDD (Time Division Multiplexing) method.

FIG. 6 is a diagram showing typical operations carried out in a reflected wave signal transmission system adopting a TDD (Time Division Multiplexing) method. In this reflected wave signal transmission system, a reflected wave signal of a received wave signal is modulated. Thus, the external apparatus 202 serving as the reflected wave signal reception apparatus repeats a state of transmitting an unmodulated carrier to the memory-card adapter 200 and receiving the reflected wave signal from a reflector and a state of transmitting data conveyed in a wave signal modulated by the external apparatus 202 itself to the reflector. On the other hand, the reflector, which is the memory-card adapter 200 having a radio communication function, repeats a state of transmitting a reflected wave signal of the unmodulated carrier to the external apparatus 202 serving as the reflected wave signal reception apparatus by including transmitted data in the reflected wave signal and, then, receiving a modulated wave signal from the external apparatus 202.

The reflected wave signal transmission system is an asymmetrical transmission system in which the speed of the upward transmission is higher than the speed of the downward transmission. The upward transmission is the transmission from the reflector to the reflected wave signal reception apparatus whereas the downward transmission is the transmission from the reflected wave signal reception apparatus to the reflector. Thus, for data transmissions with a high transmission rate on the reflector, which is the memory-card adapter 200 having a radio communication function, reduction of the power consumption can be implemented. As described above, the high transmission rate on the reflector side implies that a transmission of data from the reflector to the reflected wave signal reception apparatus occupies almost the entire communication.

Let us refer back to FIG. 1 to study radio transmission of data from the small-size memory card 203 to the external apparatus 202.

Figure 10:
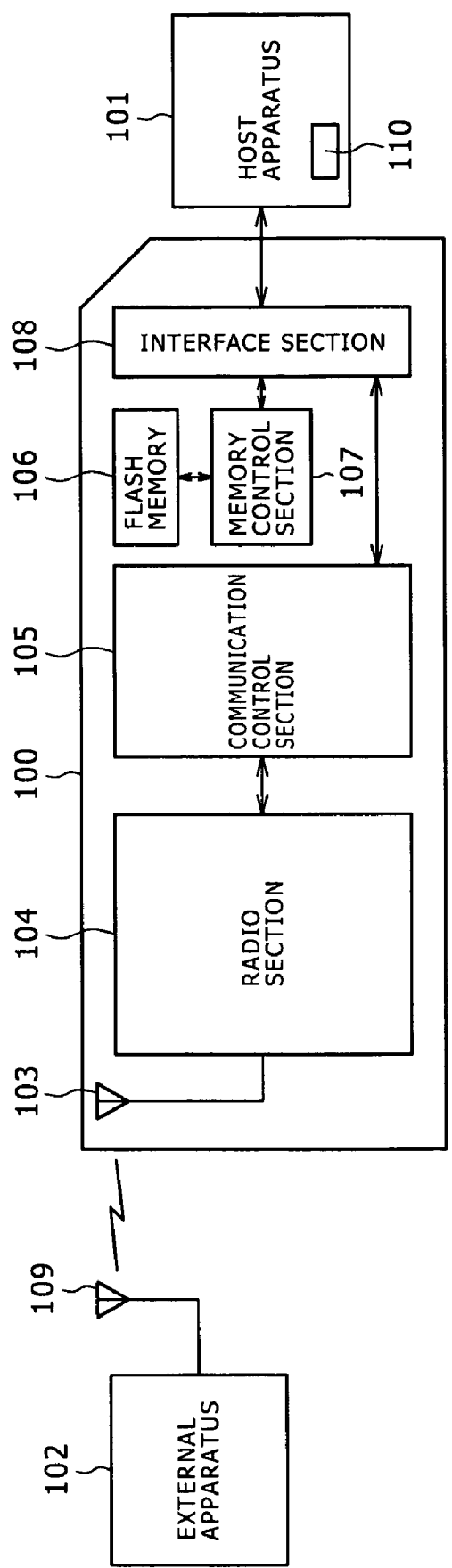
FIG. 10 is a block diagram showing a typical configuration of a memory card having a radio communication function.

In the conventional configuration, a host apparatus including a memory card mounted thereon controls radio communications. Thus, the conventional configuration has a problem that a device driver must be installed in the host apparatus. For more information on the conventional configuration, refer to patent reference 1 and FIG. 10.

In the case of this embodiment, on the other hand, the memory-card adapter 200 including the small-size memory card 203 mounted thereon employs the radio section 208. Thus, the external apparatus 202 is capable of executing control to read out data from the flash memory 204 employed in the small-size memory card 203. As a result, it is possible to solve the above problem that a device driver must be installed in the host apparatus and a problem caused by a load borne by the user to pay a high price.

Figure 7:
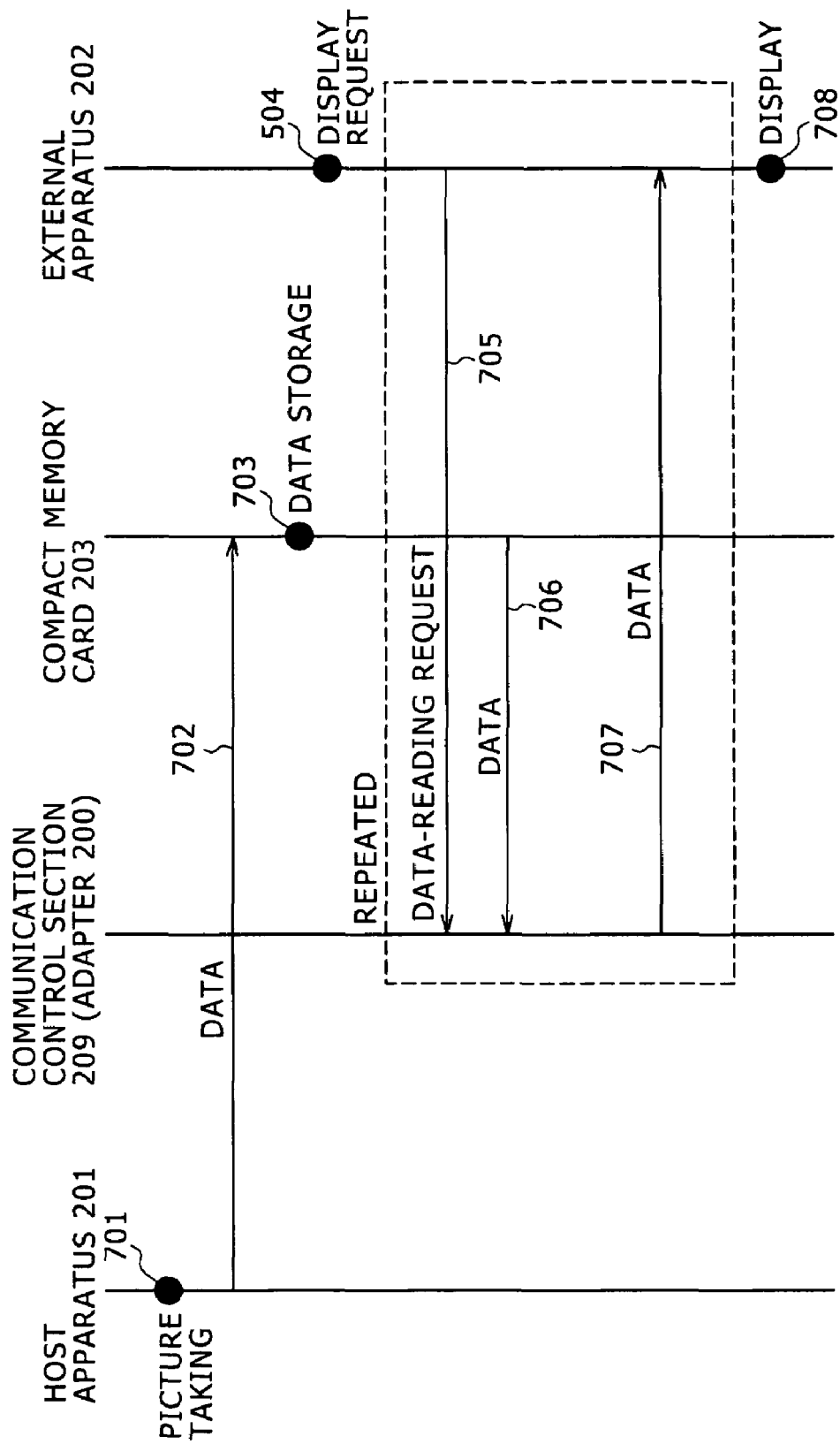
FIG. 7 is a diagram showing a sequence of operations carried out by the external apparatus 202 to read out data from a flash memory 204 employed in the small-size memory card 203.

FIG. 7 is a diagram showing a sequence of operations carried out by the external apparatus 202 to read out data from the flash memory 204 employed in the small-size memory card 203.

First of all, at a step 701, the memory-card adapter 200 including the small-size memory card 203 inserted therein is mounted on a digital camera serving as the host apparatus 201. Then, the user operates the host apparatus 201 to take an image.

Subsequently, at a step 702, the taken image is transferred from the host apparatus 201 to the small-size memory card 203 by way of the interface section 210 employed in the memory-card adapter 200. Then, at a step 703, the image is stored in the flash memory 204 employed in the small-size memory card 203.

At a step 704, a television monitor serving as the external apparatus 202 makes a request for displaying of the taken image. In place of the television monitor, any information apparatus having a display section is capable of serving as the external apparatus 202. Examples of such an information apparatus are a PC and a PDA.

In such a case, at a step 705, the external apparatus 202 transmits a request for an operation to read out the image from the flash memory 204 to the memory-card adapter 200 by way of the antenna 212. The antenna 207 employed in the memory-card adapter 200 receives the request for an operation to read out the image from the flash memory 204 and passes on the request to the communication control section 209 by way of the radio section 208.

At a step 706, the communication control section 209 forwards the request for an operation to read out the image from the flash memory 204 to the small-size memory card 203 by way of the interface section 210 and the connector section 211. In the small-size memory card 203, the request for an operation to read out the image from the flash memory 204 is supplied to the memory control section 205 by way of the interface section 206. The memory control section 205 reads out data of the requested image from the flash memory 204 and supplies the data of the image to memory-card adapter 200 by way of the interface section 206.

Then, at a step 707, the communication control section 209 transmits data of the image to the external apparatus 202 by way of the radio section 208 and the antenna 207. In the external apparatus 202, the antenna 212 receives the data of the image.

When the operation to read out all data of the desired image from the flash memory 204 is completed, the external apparatus 202 decodes the data of the image and displays the image on a display screen at a step 708.

The processing carried out at the steps 704 to 706 to transmit the data of the image from the memory-card adapter 200 to the external apparatus 202 is repeated till an operation carried out by the external apparatus 202 to process the file of the image is completed. The operation to transmit data of an image from the memory-card adapter 200 to the external apparatus 202 is composed of transactions including a transmission of an unmodulated carrier from the external apparatus 202 serving as the reflected wave signal reception apparatus to the memory-card adapter 200 and a transmission of a modulated reflected wave signal from the radio section 208 employed in the memory-card adapter 200 serving as a reflector to the external apparatus 202. Since data stored in the flash memory 204 is accessed in page units, as many transactions as pages composing a file containing the requested image are executed as described earlier by referring to FIG. 5.

As described above, by using the memory-card adapter 200 having a radio communication function, the host apparatus 201 no longer requires a driver and one memory-card adapter 200 is capable of keeping up with a plurality of compact memory cards 203. Thus, convenience enjoyed by the manufacturer and the user can be enhanced.

It is to be noted that, in general, the reflected wave signal transmission system adopts a modulation method having a relatively low bit rate. An example of the modulation method having a relatively low bit rate is the ASK (Amplitude Shift Keying) method. For example, by varying the load impedance of a directivity antenna employed by the reflector, it is possible to generate 0 and 1 signals in a signal space, or implement a BPSK modulation technique with ease. Typically, the load impedance of a directivity antenna employed by the reflector is varied by connecting and disconnecting the antenna to and from the terminator of the antenna. However, these modulation techniques raise a problem in the transmission-speed area. By providing typically a plurality of reflection lines having phases different from each other and selecting one of the reflection lines in accordance with data to be transmitted, on the other hand, phase modulation methods each having a high bit rate can be implemented. The modulation methods each having a high bit rate include the BPSK modulation method, a QPSK modulation method and an 8-phase PSK modulation method.

Figure 8:
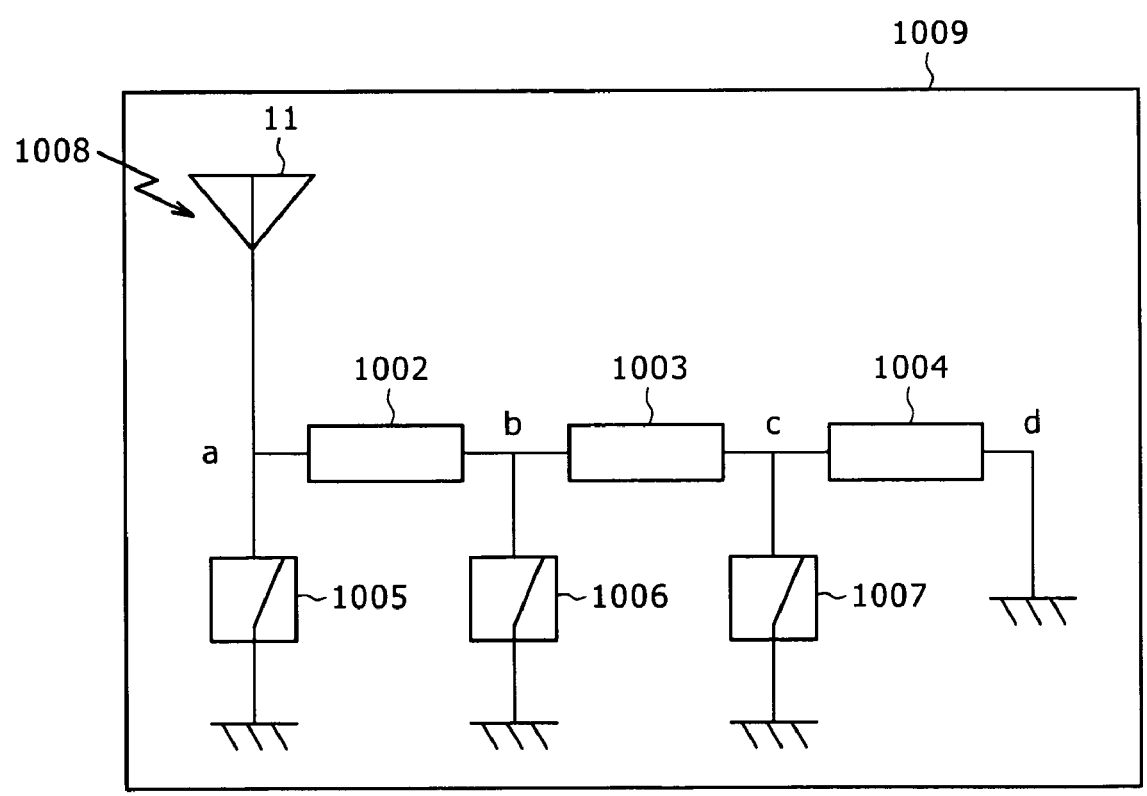
FIG. 8 is a diagram showing a typical configuration of a radio section employed in a reflector as a section for implementing the QPSK modulation method.
Figure 9:
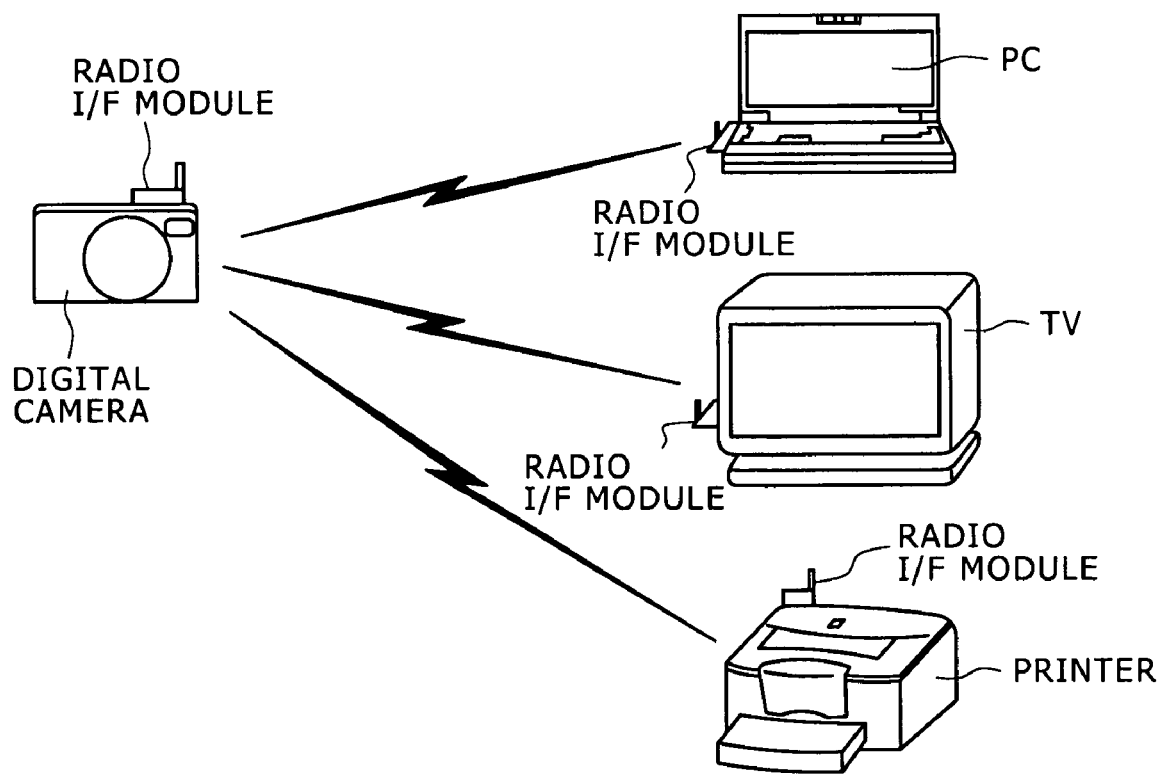
FIG. 9 is a diagram showing typical transfers of an image by radio communication from a mobile apparatus containing a memory card to an information apparatus.

FIG. 8 is a diagram showing a typical configuration of a radio section employed in the reflector as a section for implementing the QPSK modulation method. As shown in the figure, the radio section includes an antenna 1001, 3 phase shifters 1002, 1003 and 1004 connected in series to the antenna 1001 and 3 high-frequency switches 1005, 1006 and 1007. The high-frequency switch 1005 is connected between the ground and a junction point between the antenna 1001 and the antenna 1002. The high-frequency switch 1006 is connected between the ground and a junction point between the phase shifter 1002 and the phase shifter 1003. The high-frequency switch 1007 is connected between the ground and a junction point between the phase shifter 1003 and the phase shifter 1004.

The phase shifters 1002, 1003 and 1004 are each made of a wire such as a λ/8 strip line where notation λ denotes the wavelength of an arriving wave signal 1008. The length L of the strip line is determined by Eq. (1) as follows:

$$L = \lambda/8 \sqrt{\epsilon_{eff}} \quad (1)$$

where notation $\epsilon$ denotes the dielectric constant of the substrate and notation $\epsilon_{eff}$ denotes the effective dielectric constant of the substrate.

The velocity S of the signal propagation over the substrate is expressed by Eq. (2) as follows:

$$S = C_o / \sqrt{\epsilon_{eff}} \quad (2)$$

where notation $C_o$ denotes the velocity of light.

The time required by the arrival wave signal 1008 to propagate through a phase shifter can thus be expressed by Eq. (3) as follows:

$$L/S = \lambda/C_o = T/8 \quad (3)$$

where notation T denotes the period of the wave signal.

Therefore, after propagating through any one of the phase shifters 1002, 1003 and 1004 in one way, the phase of the arriving wave signal 1008 is shifted by 360/T×T/8 degrees=45 degrees. If the arriving wave signal 1008 propagates through any one of the phase shifters 1002, 1003 and 1004 both ways, the phase is shifted by 90 degrees. As described above, the phase shifters 1002, 1003 and 1004 are connected in series to the antenna 1001. Any one of the high-frequency switches 1005, 1006 and 1007 is turned on to create a short circuit to the ground any one at a junction point as a short circuit at which the arriving wave signal 1008 is reflected. If any one of the high-frequency switches 1005, 1006 and 1007 is turned off, on the other hand, such short circuit is eliminated. Thus, it is possible to produce 4 differences in phase between the arriving wave signal 1008 and the reflected wave signal by properly turning on any of the high-frequency switches 1005, 1006 and 1007 to create a short circuit to the ground on the signal line through which the wave signal propagates both ways.

If only the high-frequency switch 1005 is turned on, for example, the arriving wave signal 1008 is reflected at point a in the figure. If only the high-frequency switch 1006 is turned on, the arriving wave signal 1008 is reflected at point b in the figure. If the arriving wave signal 1008 is reflected at point b, the arriving wave signal 1008 propagates through the phase shifter 1002 both ways so that the phase of the arriving wave signal 1008 is shifted by 90 degrees in comparison with the phase of the arriving wave signal 1008 reflected at point a. If only the high-frequency switch 1007 is turned on, the arriving wave signal 1008 is reflected at point c in the figure. If the arriving wave signal 1008 is reflected at point c, the arriving wave signal 1008 propagates though the phase shifters 1002 and 1003 both ways so that the phase of the arriving wave signal 1008 is shifted by 180 degrees in comparison with the phase of the arriving wave signal 1008 reflected at point a. If none of the high-frequency switches 1005, 1006 and 1007 are turned on, the arriving wave signal 1008 is reflected at point d in the figure. If the arriving wave signal 1008 is reflected at point d, the arriving wave signal 1008 propagates through the phase shifters 1002, 1003 and 1004 both ways so that the phase of the arriving wave signal 1008 is shifted by 270 degrees in comparison with the phase of the arriving wave signal 1008 reflected at point a. In this way, it is possible to produce 4 differences in phase between the arriving wave signal 1008 and the reflected wave signal as phase differences different from each other by 90 degrees by properly selectively turning on any one of the high-frequency switches 1005, 1006 and 1007.

Data is transmitted in 2-bit units. By setting a combination of Boolean values of 0 and 1 in each of the 2-bit units, different phases are assigned to the units. In this way, the QPSK modulation method can be implemented. To put it concretely, data transmitted is delimited into 2-bit units. In order to set 00 in a 2-bit unit, only the high-frequency switch 1005 is turned on. In order to set 01 in a 2-bit unit, only the high-frequency switch 1006 is turned on. In order to set 11 in a 2-bit unit, only the high-frequency switch 1007 is turned on. In order to set 10 in a 2-bit unit, none of the high-frequency switches 1005, 1006 and 1007 are turned on.

By setting proper values in 2-bit units as described above, it is possible to produce 4 differences in phase between an incoming signal and a reflected signal as phase differences different from each other by 90 degrees. In addition, since four points (0, 0), (0, 1), (1, 0) and (1, 1) can be set in a signal space, a reflected signal modulated by adopting the QPSK modulation method can be generated.

For example, Japanese Patent Laid-open No. 2003-352223, the patent right associated with which has been granted to the inventors of the present invention, discloses a communication system adopting the back-scatter method for carrying out a QPSK modulation process.

The present invention has been described in detail above by explaining a preferred embodiment. It is obvious, however, that a person skilled in the art is capable of modifying the embodiment and creating a substitute for the embodiment in a domain not deviating from essentials of the present invention.

In accordance with the present invention, an image taken by a host apparatus such a digital camera can be transmitted from a memory card for storing the image to an external apparatus such as a PC, a television or a printer by radio communication without the need to install driver software for controlling the communication in the host apparatus.

In addition, by adopting the reflected wave signal transmission technique as the radio transmission method, reduction of the power consumption can be implemented. In particular, means for carrying out radio transmissions at a low power consumption is even demanded for communications of a high transmission rate, that is, communications in which a transmission of data from an image input apparatus such as a digital camera to an image display apparatus occupies almost the entire communication. For example, a mobile apparatus can be used to implement transmissions of images at a power consumption about 10 times smaller than that of the radio LAN. Thus, the life of a battery providing power to the mobile apparatus can be substantially prolonged.

On top of that, by adopting the reflected wave signal transmission technique as the radio transmission method, the radio transmission module employed in the mobile apparatus serving as a data transmitter can be produced with ease at a cost lower than that of the radio LAN. Moreover, since the radio transmission module employed in the mobile apparatus is not an object of a radio station in accordance with the radio law, a certification work such as issuance of a certificate of conformance is not required.

The specification explains mainly a typical configuration in which the memory-card adapter includes a reflector, and communications of data between the memory-card adapter and the external apparatus are implemented by adoption of a reflected wave signal transmission method. However, essentials of the present invention are not limited to such a typical configuration. For example, even if communications such as the radio-LAN communication and the Bluetooth communication are carried out, in the same way, it is possible to solve problems such as the need to install a device driver in the host apparatus, the need to increase the number of product lines for the memory card and the need to impose a high price on the user.

In brief, the present invention has been described in detail above by explaining a preferred embodiment, which should not be interpreted as a limitation imposed on the scope of the present invention. That is to say, essentials of the present invention should be determined only by referring to claims appended to this specification.

What is claimed is:

1. An adapter for accommodating a memory card, said adapter comprising:
   an insertion section that allows for a memory card to be removably inserted into said insertion section;
   a host apparatus interface section for electrically interfacing with a host apparatus;
   a radio communication section for carrying out communications with an external apparatus through a radio transmission, the radio communication section transferring both control information and data that is stored in and transferred from the memory card;
   a communication control section for controlling communications carried out by said radio communication section; and
   a memory card interface section far controlling access made by said external apparatus to said memory card which has been inserted into said insertion section.

2. The adapter according to claim 1 wherein said radio communication section carries out communications to transmit data read out from said memory card already inserted into said insertion section through said radio transmission line to said external apparatus independently of said host apparatus.

3. The adapter according to claim 1, wherein said radio communication section transmits a reflected wave signal obtained as a result of a process to modulate a wave signal received from said external apparatus on the basis of data to be transmitted to said external apparatus.

4. The adapter according to claim 3, the wave signal received from said external apparatus is modulated by carrying out switching operations to vary the load impedance of the antenna or give phase variations to the reflected wave signal.

5. The adapter according to claim 1 wherein said communication control section and said memory card interface section receive power to carry out operations from said host apparatus.

6. The adapter according to claim 1 wherein said memory card interface section controls operations to make accesses to said memory card already inserted into said insertion section in accordance with a connection state of said radio communication section.

7. The adapter according to claim 6 wherein said memory card interface section selectively allows either an access made by said host apparatus to said memory card or an access made by said external apparatus to said memory card.

8. The adapter according to claim 6 wherein said memory card interface section inhibits an access made by said host apparatus to said memory card while an access is being made by said external apparatus to said memory card.

9. The adapter according to claim 1 wherein said memory card interface section accepts a request made by said external apparatus to read out data from said memory card already inserted into said insertion section but turns down a request made by said external apparatus to write data into said memory card already inserted into said insertion section.

10. A memory unit including a memory card removably insertable into a portion of an adapter that accommodates said memory card, wherein said memory card comprises:
    a memory section used for storing data;
    a memory control section for controlling accesses to said memory section; and
    an adapter interface section;
    and wherein said adapter comprises:
    an insertion section that allows said memory card to be removably inserted into said insertion section;
    a host apparatus interface section for electrically interfacing with a host apparatus when the adapter is removably inserted into said host apparatus;
    a radio communication section for carrying out communications with an external apparatus through a radio transmission, the radio communication section transferring both control information and data that is stored in and transferred from the memory card;
    a communication control section for controlling communications carried out by said radio communication section; and
    a memory card interface section for passing on memory card accesses made by said host apparatus and memory card accesses made by said external apparatus to said memory card which has been inserted into said insertion section.

11. The memory unit according to claim 10 wherein said radio communication section carries out communications to transmit data read out from said memory card already inserted into said insertion section through said radio transmission line to said external apparatus independently of said host apparatus.

12. The memory unit according to claim 10 wherein said radio communication section transmits a reflected wave signal obtained as a result of a process to modulate a wave signal received from said external apparatus on the basis of data to be transmitted to said external apparatus.

13. The memory unit according to claim 12, the wave signal received from said external apparatus is modulated by carrying out switching operations to vary the load impedance of the antenna or give phase variations to the reflected wave signal.

14. The memory unit according to claim 10 wherein said communication control section and said memory card interface section receive power to carry out operations from said host apparatus.

15. The memory unit according to claim 10 wherein said memory card interface section controls operations to make accesses to said memory card already inserted into said insertion section in accordance with a connection state of said radio communication section.

16. The memory unit according to claim 15 wherein said memory card interface section selectively allows either an access made by said host apparatus to said memory card or an access made by said external apparatus to said memory card.

17. The memory unit according to claim 15 wherein said memory card interface section inhibits an access made by said host apparatus to said memory card while an access is being made by said external apparatus to said memory card.

18. The memory unit according to claim 10 wherein said memory card interface section accepts only a request made by said external apparatus to read out data from said memory card already inserted into said insertion section but turns down a request made by said external apparatus to write data into said memory card already inserted into said insertion section.

19. A memory card device comprising:
   a host apparatus interface section for electrically interfacing with a host apparatus;
   a radio communication section for carrying out communications with an external apparatus through a radio transmission, the radio communication section transferring both control information and data that is stored in and transferred from the memory card;
   a communication control section for controlling communications carried out by said radio communication section; and
   a memory card interface section for controlling access made by said external apparatus to said memory card;
   wherein said radio communication section transmits a reflected wave signal obtained as a result of a process to modulate a wave signal received from said external apparatus on the basis of data to be transmitted to said external apparatus, the wave signal received from said external apparatus is modulated by carrying out switching operations to vary the load impedance of the antenna or give phase variations to the reflected wave signal.

* * * * *